United States Patent [19]
Son

[11] Patent Number: 6,122,731
[45] Date of Patent: Sep. 19, 2000

[54] METHOD AND APPARATUS FOR CORRECTING PROGRAM OF HARD DISK DRIVE

[75] Inventor: Ok-Hyun Son, Suwon, Rep. of Korea

[73] Assignee: SamSung Electronics Co., Ltd., Suwon, Rep. of Korea

[21] Appl. No.: 08/922,303

[22] Filed: Sep. 2, 1997

[30]     Foreign Application Priority Data

Sep. 2, 1996 [KR] Rep. of Korea ...................... 96-37920

[51] Int. Cl.[7] ...................................................... G06F 9/44
[52] U.S. Cl. .............................................. 713/1; 713/100
[58] Field of Search ........................................ 713/1, 100

[56]             References Cited

U.S. PATENT DOCUMENTS

| | | | |
|---|---|---|---|
| 4,542,453 | 9/1985 | Patrick et al. ............................... | 714/8 |
| 5,287,363 | 2/1994 | Wolf et al. ................................. | 714/718 |
| 5,481,713 | 1/1996 | Wetmore et al. . | |
| 5,619,698 | 4/1997 | Lillich et al. . | |
| 5,694,566 | 12/1997 | Nagae ......................................... | 711/1 |
| 5,796,546 | 8/1998 | Sasamoto et al. .................... | 360/78.04 |
| 5,796,974 | 8/1998 | Goddard et al. ......................... | 712/211 |

OTHER PUBLICATIONS

Van Wolverton, "Running MS–DOS", 1991, pp. 84–87.

*Primary Examiner*—Dennis M. Butler
*Attorney, Agent, or Firm*—Robert E. Bushnell, Esq.

[57]             ABSTRACT

A method for correcting an operating program of a hard disk drive. A break point is set in an address to be corrected from an operating program stored in a storage area of a hard disk drive, and a machine language of a program to be added to the operating program is converted into an execution file suitable for an operating system. The machine language converted into the execution file is written into a unused specific area of a disk. If the address in which the break point is set is implemented while carrying out the operating program after an initial power is supplied, a break interrupt is generated and the machine language of the added program written into the specific area of the disk is executed to correct the operating program.

16 Claims, 3 Drawing Sheets

METHOD AND APPARATUS FOR CORRECTING PROGRAM OF HARD DISK DRIVE

CLAIM OF PRIORITY

This application makes reference to, incorporates the same herein, and claims all benefits accruing under 35 U.S.C. §119 from an application for Method for Correcting Program of Hard Disk Drive earlier filed in the Korean Industrial Property Office on Sep. 2, 1996 and there duly assigned Ser. No. 37920/1996.

FIELD OF THE INVENTION

The present invention relates to a system operating program of a hard disk drive and, more particularly, to a method for correcting the operating program when a defect is generated during the operation of a system.

DESCRIPTION OF THE RELATED ART

Generally, electronic products having a microprocessor contain a system operating program for controlling their operation. Since the system operating program controls almost all operation, even a serious defect of the electronic products can be solved by only replacing the system operating program. A method for replacing the system operating program differs according to an area in which that program is stored. A hard disk drive having an input/output device in a personal computer additionally stores its operating system in an internal ROM (Read Only Memory). A PROM (Programmable Read Only Memory) is mainly used as the ROM.

However, although the PROM used in the hard disk drive is low in price compared with an EEPROM (Electrically Erasable and Programmable Read Only Memory) or a flash ROM, since once written contents can not be corrected, there are problems when replacing the operating program. That is, the PROM should be replaced with a new one into which the operating program is written, and thus there are a burden of cost and the consumption of time.

U.S. Pat. No. 5,481,713 for a Method and Apparatus for Patching Code Residing on a Read Only Memory Device to Wetmore et al discloses a method for correcting programs found in read only memory. However, Wetmore et al '713 does not disclose correcting programs on a hard disk drive. What is needed is a method for correcting programs on a hard disk drive.

SUMMARY OF THE INVENTION

It is therefore an object to provide a method for correcting an operating program of a hard disk drive.

It is also an object to provide a method for correcting a program in a hard disk drive through a floppy disk in which an additional solution program is stored without replacing a PROM storing the operating program.

In accordance with one aspect of the invention, there is provided a method for correcting an operating program of a hard disk drive including the steps of: setting a break point in an address to be corrected from the operating program stored in a storage area of the hard disk drive, converting a machine language of a program to be added to the operating program into an execution file suitable for an operating system and writing the machine language converted into the execution file into a unused specific area of a disk; and if the address in which the break point is set is implemented while carrying out the operating program after an initial power is supplied, generating a break interrupt and executing the machine language of the added program written into the specific area of the disk to correct the operating program.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
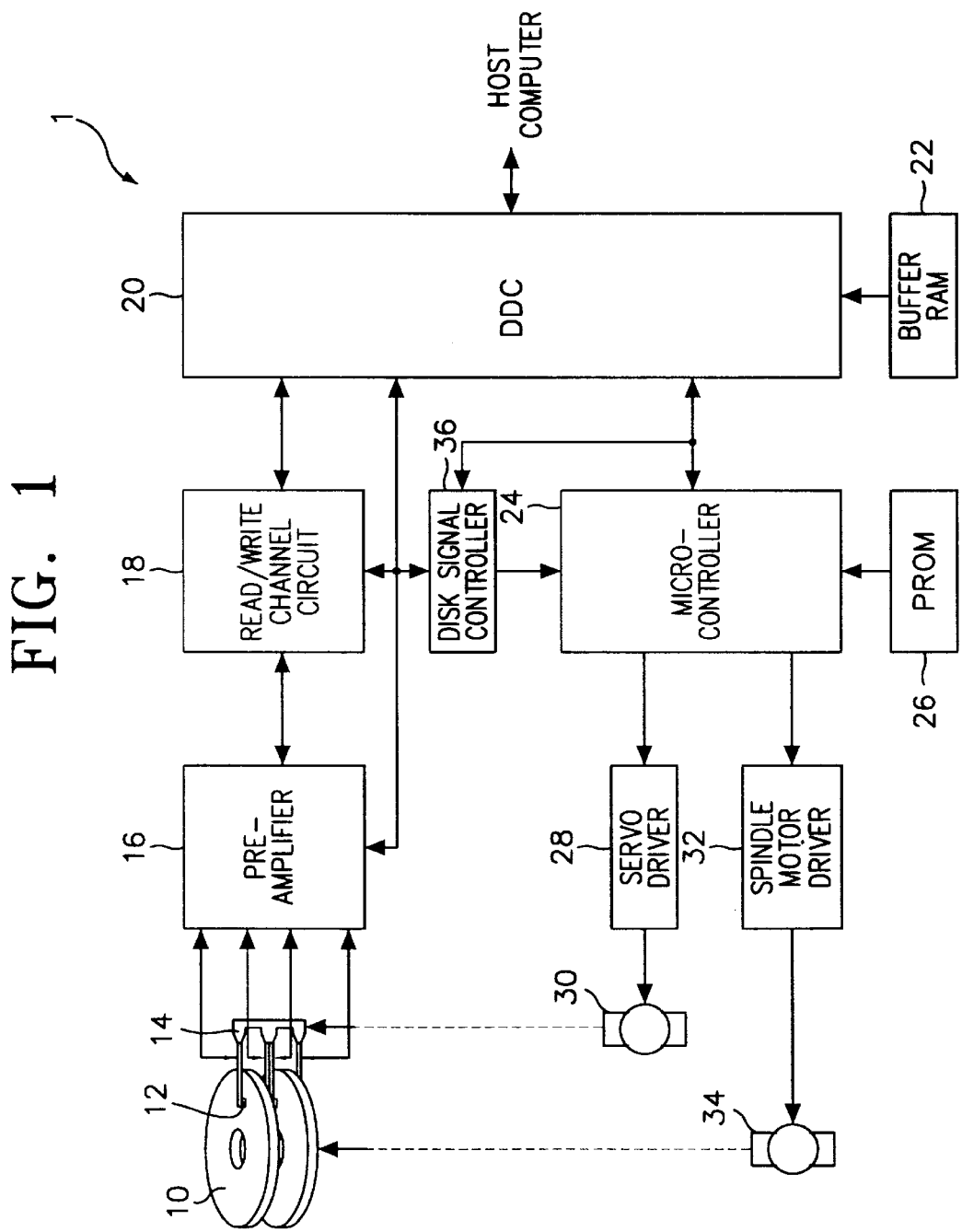
FIG. 1 is a schematic block diagram of a general hard disk drive.

FIG. 1 is a block diagram of a general hard disk drive 1. Disks 10 are rotated by a spindle motor 34. Magnetic heads 12 are positioned on the surface of a corresponding disk among the disks 10, and installed correspondingly at support arms extended toward the disks 10 from an E-block assembly 14 which is coupled with a rotary voice coil actuator 30. A pre-amplifier 16 pre-amplifies, during reading, a signal picked up by one of the heads 12 and supplies an analog read signal to a read/write channel circuit 18. During writing, the pre-amplifier 16 writes encoded write data received from the read/write channel circuit 18 into the disk through one of the heads 12. The read/write channel circuit 18 detects and decodes a data pulse from the read signal received from the pre-amplifier 16, and supplies the decoded data pulse to a disk data controller (DDC) 20. The read/write channel circuit 18 also decodes the write data received from the DDC 20 and supplies the decoded data to the pre-amplifier 16. The DDC 20 writes data received from a host computer into the disk through the read/write channel circuit 18 and the pre-amplifier 16, or reads data from the disk to supply the read data to the host computer. The DDC 20 also interfaces communication between the host computer and a microcontroller 24. A buffer RAM (Random Access Memory) 22 temporarily stores data transmitted between the host computer, the microcontroller 24 and the read/write channel circuit 18. The microcontroller 24 controls the DDC 20 in response to a read or write command received from the host computer and controls track search and track follow-up. A PROM 26 stores an execution program and various setting values of the microcontroller 24. A servo driver 28 supplies, to a voice coil of the actuator 30, a driving current for driving the actuator 30 by a position control signal of the heads 12 generated from the microcontroller 24. The actuator 30 shifts the heads 12 within the disks 10 in response to the direction and level of the driving current received from the servo driver 28. A spindle motor driver 32 rotates the disks 10 by driving the spindle motor 34 according to a rotating control value of the disks 10 generated from the microcontroller 24. A disk signal controller 36 generates various timing signals necessary for reading/writing on the basis of the control of the microcontroller 24 and decodes servo data to supply the decoded servo data to the microcontroller 24.

Figure 2:
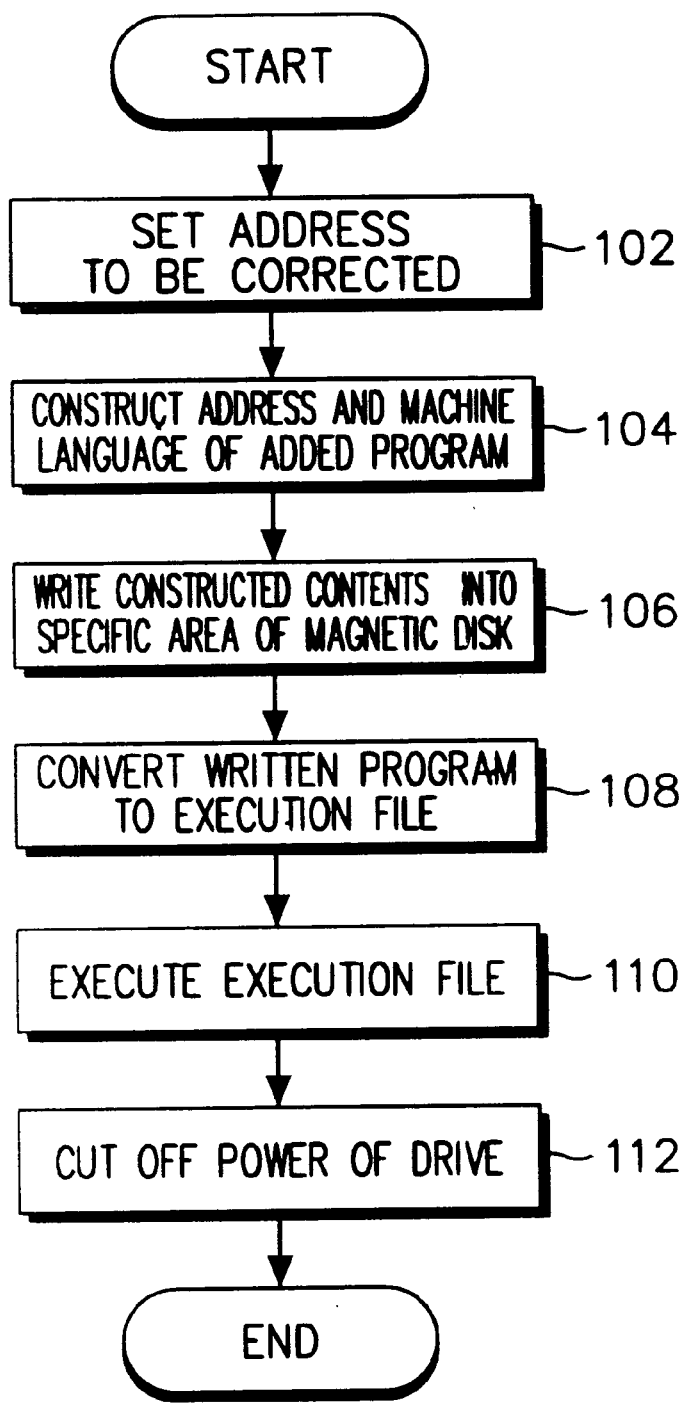
FIG. 2 is a flow chart showing an execution procedure for writing a program added to correct an operas program of a hard disk drive according to the present invention.
Figure 3:
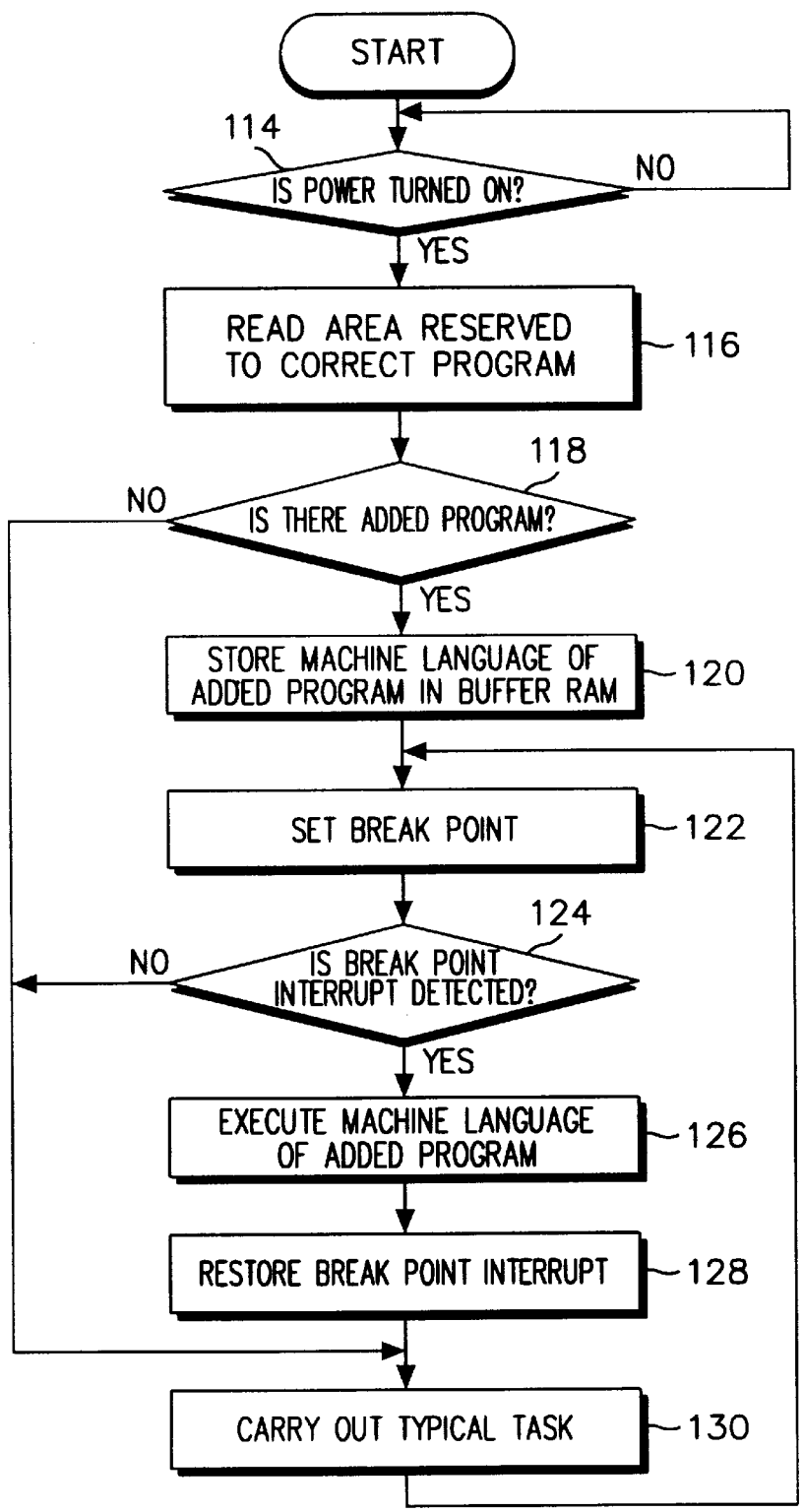
FIG. 3 a flow chart showing a control procedure for correcting an operating program of a hard disk drive according to the present invention.

FIGS. 2 and 3 are control flows for correcting an operating program of the hard disk drive according to the present invention. FIG. 2 shows a procedure executed by a programmer in order to search an address to be corrected in the PROM and to write a machine code of a program to be added into the magnetic disk of the hard disk drive. FIG. 3 shows a control procedure executed by the microprocessor in order to correct an operating program by using the machine code of the added program written into the magnetic disk.

Referring to FIG. 2, a programmer determines an address into which the added program is inserted at step 102. This is obtained by confirming parts requiring correction in the operating program stored in the PROM. At step 104, the programmer constructs an address into which the added program are inserted and a machine language of the added program as listed in Table 1.

TABLE 1

| Break | Total number of break addresses | Break address 1 | Machine language 1 |
|---|---|---|---|
| Break address 2 | Machine language 2 | Break address 3 | Machine language 3 |
| ... | | | |

In the above Table 1, the break is an identifier which should be confirmed whenever a power is applied to the hard disk drive and includes two character strings. If the total number of break points is not 0, there is a break point to be set. The break address is a start address performing correction in the program, and this address is set to the break point. If the break address is implemented, an interrupt service is called by a function of the microcontroller 24. After the address and the machine language of the added program are constructed at step 104, the programmer writes the constructed contents into an unused area of the magnetic disk 10 of the hard disk drive at step 106. A method for writing data into the magnetic disk of the hard disk drive is well known to those skilled in the art and will therefore not be described herein. At step 108, the programmer converts the written program into an execution file suitable for a DOS or other operating systems. The programmer executes the execution file at step 110 and cuts off a power of the hard disk drive at step 112.

After searching the address to be corrected in the PROM and writing the machine code of the added program into the magnetic disk of the hard disk drive, an actual execution procedure is illustrated in FIG. 3. At step 114, the microcontroller 24 checks whether the power of the hard disk drive is turned on. If so, the microcontroller 24 reads, at step 116, an area reserved to correct the program from a maintenance area of the magnetic disk 10 through the head before a command is transmitted from the host computer. At step 118, the microcontroller 24 checks whether the added program exists in the reserved area. If there is no added program, the microcontroller 24 implements a typical task at step 130. If the added program exists, the microcontroller 24 stores the machine language of the added program written into the magnetic disk 10 in the buffer RAM 22 at step 120. At step 122, the microcontroller 24 sets the break point in an added address of the PROM 26. Therefore, while carrying out the control operation of a system by the system operating program stored in the PROM 26, if an address in which the break point is set is carried out, an interrupt is generated. The microcontroller 24 checks, at step 124, whether the break point interrupt is detected. If so, the microcontroller 24 reads and executes, at step 126, the machine language of the added program stored in the buffer RAM 22. The microcontroller 24 restores, at step 128, the break point interrupt, and performs, at step 130, the typical task by the operating program.

As described above, when correcting the operating program of the hard disk drive, the operating program is corrected through the floppy disk in which an additional solution program is stored without replacing the PROM storing the operating program. Therefore, the loss of cost and the consumption of time generated by replacing the PROM can be reduced.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for correcting a system operating program stored in a storage area in a hard disk drive, comprising the steps of:

setting a break point interrupt in an address to be corrected from said system operating program stored in said storage area in said hard disk drive;

constructing a patch program to be added to said system operating program;

writing constructed contents of said patch program into a reserved area of the hard disk drive;

determining whether said break point interrupt is detected; and executing said patch program when said break point interrupt is detected.

2. The method of claim 1, said storage area of said hard disk drive storing said system operating program being a Read Only Memory of said hard disk drive.

3. The method of claim 1, further comprising the step of cutting off power of the hard disk drive after said step of executing said patch program.

4. The method of claim 1, wherein said step of executing said patch program when said break point interrupt is detected is further comprised of the steps of:

reading said reserved area of said hard disk drive;

determining whether said patch program is stored in said reserved area of said hard disk drive;

storing said patch program in a buffer random access memory; and executing said patch program.

5. The method of claim 1, said reserved area of said hard disk drive initially being a hard disk of said hard disk drive.

6. The method of claim 5, further comprising the step of storing said patch program stored on said hard disk of said hard disk drive to a buffer random access memory of said hard disk drive.

7. A method for correcting a system operating program, comprising the steps of:

storing, in a storage area in a hard disk drive, said system operating program;

setting a break point interrupt in an address to be corrected from said system operating program;

storing a patch program to be added to said system operating program in a reserved area of said hard disk drive;

reading said area reserved in said hard disk drive when said hard disk drive is powered on;

determining whether there is a patch program in said reserved area of the hard disk drive;

storing said patch program in a buffer random access memory;

determining whether said break point interrupt is detected; and executing said patch program.

8. The method of claim 7, further comprising the step of detecting said break point interrupt after said step of executing said patch program.

9. The method of claim 7, said storage area of said hard disk drive storing said system operating program being a Read Only Memory of said hard disk drive.

10. The method of claim 7, said reserved area of said hard disk drive initially being a hard disk of said hard disk drive.

11. The method of claim 10, further comprising the step of storing said patch program stored on said hard disk of said hard disk drive to a buffer random access memory of said hard disk drive.

12. An apparatus for correcting a system operating program stored in a storage area in a hard disk drive, comprising:

a plurality of disks rotated by a spindle motor;

a microprocessor determining whether there is a patch program in a reserved area of said hard disk drive, storing said patch program in a buffer random access memory, determining whether a break point interrupt is detected, and executing said patch program for correcting said system operating program stored in said hard disk drive; and interface means connecting said plurality of disks to said microprocessor for conveying control information therebetween.

13. The apparatus of claim 12, further comprising programmable read only memory connected to said microprocessor.

14. The apparatus of claim 12, said storage area of said hard disk drive storing said system operating program being a Read Only Memory of said hard disk drive.

15. The apparatus of claim 12, said reserved area of said hard disk drive initially being a hard disk of said hard disk drive.

16. The apparatus of claim 15, further comprising a buffer random access memory of said hard disk drive storing said patch program initially stored on said hard disk of said hard disk drive.

\* \* \* \* \*